(12) United States Patent
Cooper et al.

(10) Patent No.: US 11,486,838 B2
(45) Date of Patent: Nov. 1, 2022

(54) METHOD AND SYSTEM OF A NEUTRON TUBE

(71) Applicant: HALLIBURTON ENERGY SERVICES, INC., Houston, TX (US)

(72) Inventors: Paul A. Cooper, Houston, TX (US); Weijun Guo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/426,978

(22) PCT Filed: Sep. 18, 2012

(86) PCT No.: PCT/US2012/055873
§ 371 (c)(1),
(2) Date: Mar. 9, 2015

(87) PCT Pub. No.: WO2014/046641
PCT Pub. Date: Mar. 27, 2014

(65) Prior Publication Data
US 2016/0061990 A1 Mar. 3, 2016

(51) Int. Cl.
| | |
|---|---|
| *E21B 49/00* | (2006.01) |
| *G01N 23/09* | (2018.01) |
| *G01V 5/10* | (2006.01) |
| *E21B 47/11* | (2012.01) |
| *H05H 3/06* | (2006.01) |

(52) U.S. Cl.
CPC ............. *G01N 23/09* (2013.01); *E21B 47/11* (2020.05); *E21B 49/00* (2013.01); *G01V 5/10* (2013.01); *G01V 5/101* (2013.01); *G01V 5/102* (2013.01); *H05H 3/06* (2013.01)

(58) Field of Classification Search
CPC . G01V 5/06; G01V 5/04; G01V 5/101; G01T 1/40; G01N 33/2823
See application file for complete search history.

(56) References Cited

U.S. PATENT DOCUMENTS

| | | |
|---|---|---|
| 2,769,096 A | 10/1956 | Frey, Jr. |
| 2,973,444 A | 2/1961 | Dewan |

(Continued)

FOREIGN PATENT DOCUMENTS

| | | |
|---|---|---|
| EP | 0483517 A2 | 5/1992 |
| KR | 1020020076639 A | 10/2002 |
| WO | 2009070535 A1 | 6/2009 |

OTHER PUBLICATIONS

International Search Report and Written Opinion dated Apr. 23, 2013 for PCT Application No. PCT/US2012/055873 filed on Sep. 18, 2012.

(Continued)

*Primary Examiner* — David P Porta
*Assistant Examiner* — Mamadou Faye
(74) *Attorney, Agent, or Firm* — K&L Gates LLP

(57) ABSTRACT

A neutron tube. At least some of the illustrative embodiments including: generating, from a neutron tube, a first neutron burst having a first characteristic energy spectra; and generating, from the neutron tube, a second neutron burst having a second characteristic energy spectra different than the first characteristic energy spectra, the generating the second neutron burst within one second of generating the first neutron burst.

18 Claims, 10 Drawing Sheets

(56) References Cited

U.S. PATENT DOCUMENTS

| | | | |
|---|---|---|---|
| 2,996,618 A | 8/1961 | Goodman et al. | |
| 3,566,116 A | 2/1971 | Nelligan | |
| 4,093,854 A | 6/1978 | Turcotte et al. | |
| 4,119,858 A * | 10/1978 | Granberg | H05H 3/06 376/116 |
| 4,996,017 A * | 2/1991 | Ethridge | H05H 3/06 376/116 |
| 5,066,301 A * | 11/1991 | Wiley | A61F 2/1613 351/159.21 |
| 5,080,693 A * | 1/1992 | Bourne | G21F 9/02 376/245 |
| 5,481,116 A | 1/1996 | Glavish | |
| 6,141,395 A | 10/2000 | Nishimura et al. | |
| 9,230,772 B2 * | 1/2016 | Zhou | H01J 27/02 |
| 2002/0131542 A1 | 9/2002 | Leung | |
| 2002/0131543 A1 | 9/2002 | Leung | |
| 2003/0165213 A1 * | 9/2003 | Maglich | G01N 23/222 376/159 |
| 2006/0017010 A1 * | 1/2006 | Vanderberg | H01J 37/3171 250/492.1 |
| 2007/0295911 A1 | 12/2007 | Sved | |
| 2008/0080659 A1 | 4/2008 | Leung et al. | |
| 2009/0045329 A1 * | 2/2009 | Stoller | G01V 5/10 250/269.4 |
| 2009/0108191 A1 | 4/2009 | Groves | |
| 2010/0038550 A1 * | 2/2010 | DeVito | G01V 5/0069 250/370.11 |
| 2010/0276581 A1 | 11/2010 | Bliven | |
| 2011/0044418 A1 * | 2/2011 | Stubbers | H05H 3/06 376/116 |
| 2011/0180698 A1 * | 7/2011 | Stephenson | H05H 3/06 250/269.1 |

OTHER PUBLICATIONS

Gow, J.D. et al., "Development of a Compact Evacuated Pulsed Neutron Source," Review of Scientific Instruments, vol. 31, No. 3, Mar. 1960, pp. 235-240.

* cited by examiner

METHOD AND SYSTEM OF A NEUTRON TUBE

BACKGROUND

Well logging is a technique used to identify characteristics of earth formations surrounding a borehole. The interrogation of a formation surrounding a borehole to identify one or more characteristics may be by sound, electrical current, electromagnetic waves, or high energy nuclear particles (e.g., gamma particles, or neutrons). In the case of interrogation by neutrons, in many cases the formation property to be measured dictates the characteristic energy spectra of neutrons to be used for the interrogation. That is, particular formation properties of interest are better and/or more easily measured with neutron bursts of particular characteristic energy spectra. However, commercially available neutron tubes suitable for downhole use have limited functionality.

BRIEF DESCRIPTION OF THE DRAWINGS

For a detailed description of exemplary embodiments, reference will now be made to the accompanying drawings in which.

NOTATION AND NOMENCLATURE

Figure 1:
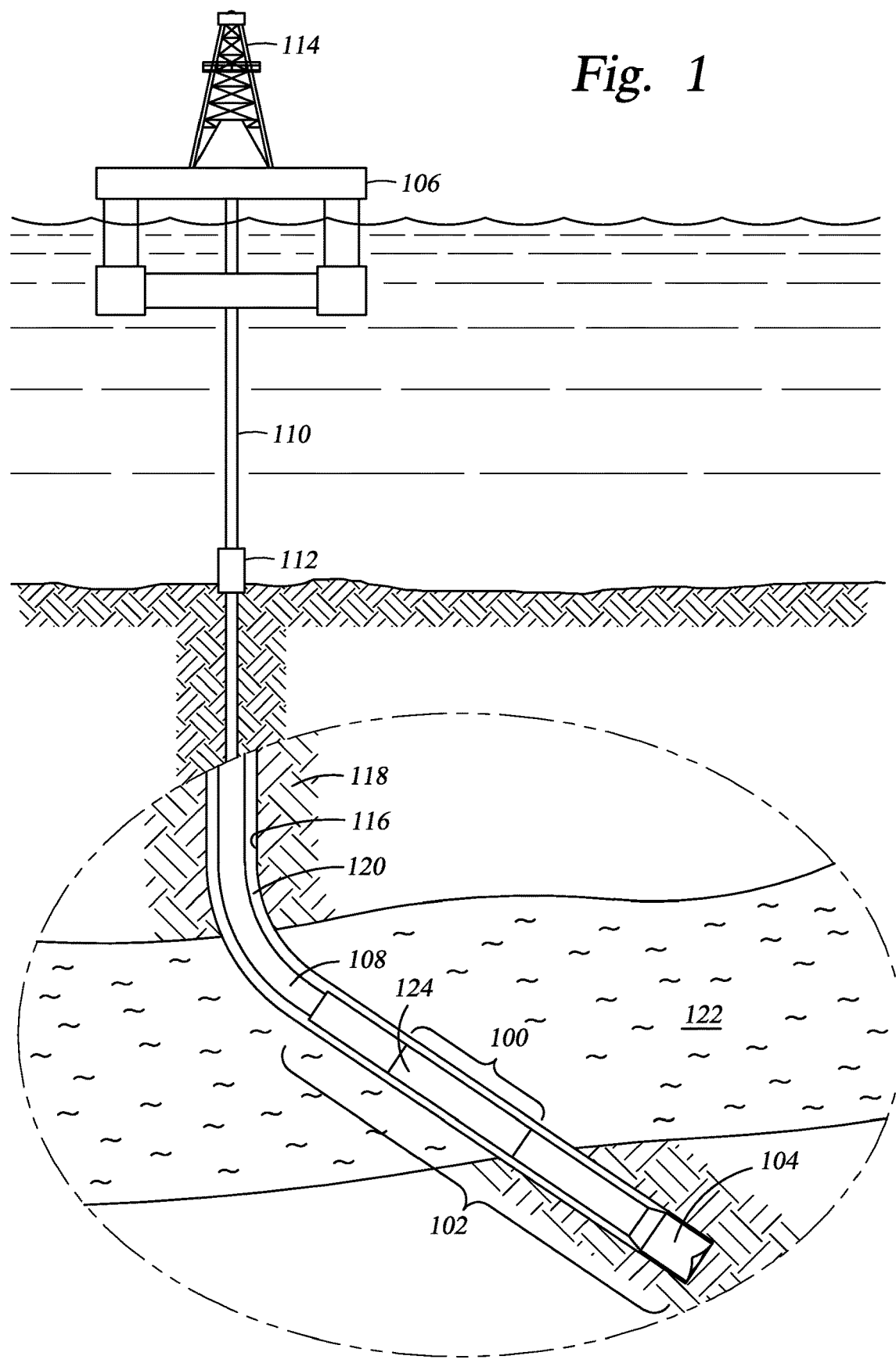
FIG. 1 shows a subsea drilling operations in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

Collision reactions between ionized gases and atoms disposed in a target material are expressed in the form "{ionized gas}-{target material} reaction(s)." Thus, for example, while a deuterium-tritium reaction may create neutrons of approximately the same energies as a tritium-deuterium reaction, the reactions will still be considered different reactions for identification purposes.

"Characteristic energy spectra" in relation to a neutron burst shall mean an expected range of energies of neutrons and an expected range of intensities of the neutrons for collision reactions between atoms of particular type (e.g., deuterium-tritium reactions, deuterium-deuterium reacts, tritium-tritium reactions). The fact that as between any two neutron bursts (for the same reactants) actual range energy and actual intensities may differ shall not obviate the fact that the two neutron bursts have the same characteristic energy spectra.

"Linear path" in terms of the physical relationship between an acceleration region and a target material shall refer to a straight line relationship.

"Deflected path" in terms of the physical relationship between an acceleration region and a target material shall refer to a path from the acceleration region to the target material that has curvature.

In reference to field strength of a magnetic field, an absent magnetic field shall be considered to have field strength (of zero). Moreover, field strength shall include polarity. For example, two magnetic fields with the same magnitude, but different polarity, shall be considered to have different field strengths.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various neutron tubes discussed below were developed in the context of using the neutron tubes in logging tools associated with hydrocarbon exploration, and thus the description that follows is based on the developmental context; however, the neutron tubes find application not only with logging tools, but also in applications wholly unrelated to hydrocarbon exploration (e.g., medical treatments, explosive detection). Thus, the developmental context shall not be construed as a limitation as to the applicability of the various embodiments.

FIG. 1 shows a bottomhole assembly 102 for a subsea drilling operation, where the bottomhole assembly 102 comprises a formation evaluation tool 100 and a drill bit 104. The bottomhole assembly 102 is lowered from a drilling platform 106 by way of a drill string 108. The drill string 108 extends through a riser 110 and a well head 112. Drilling equipment supported within and around derrick 114 rotates the drill string 108 and the drill bit 104, causing the bit 104 to form a borehole 116 through a formation material 118. The volume defined between the drill string 108 and the borehole 116 is referred to as the annulus 120. The borehole 116 penetrates subterranean zones or reservoirs, such as reservoir 122, believed to contain hydrocarbons in a commercially viable quantity. In addition to the formation evaluation tool 100, the bottomhole assembly 102 may also contain various other systems, such as a down hole drill motor, a rotary steerable tool, a mud pulse telemetry system, and other measuring-while-drilling and/or logging-while-drilling sensors and systems.

Figure 2:
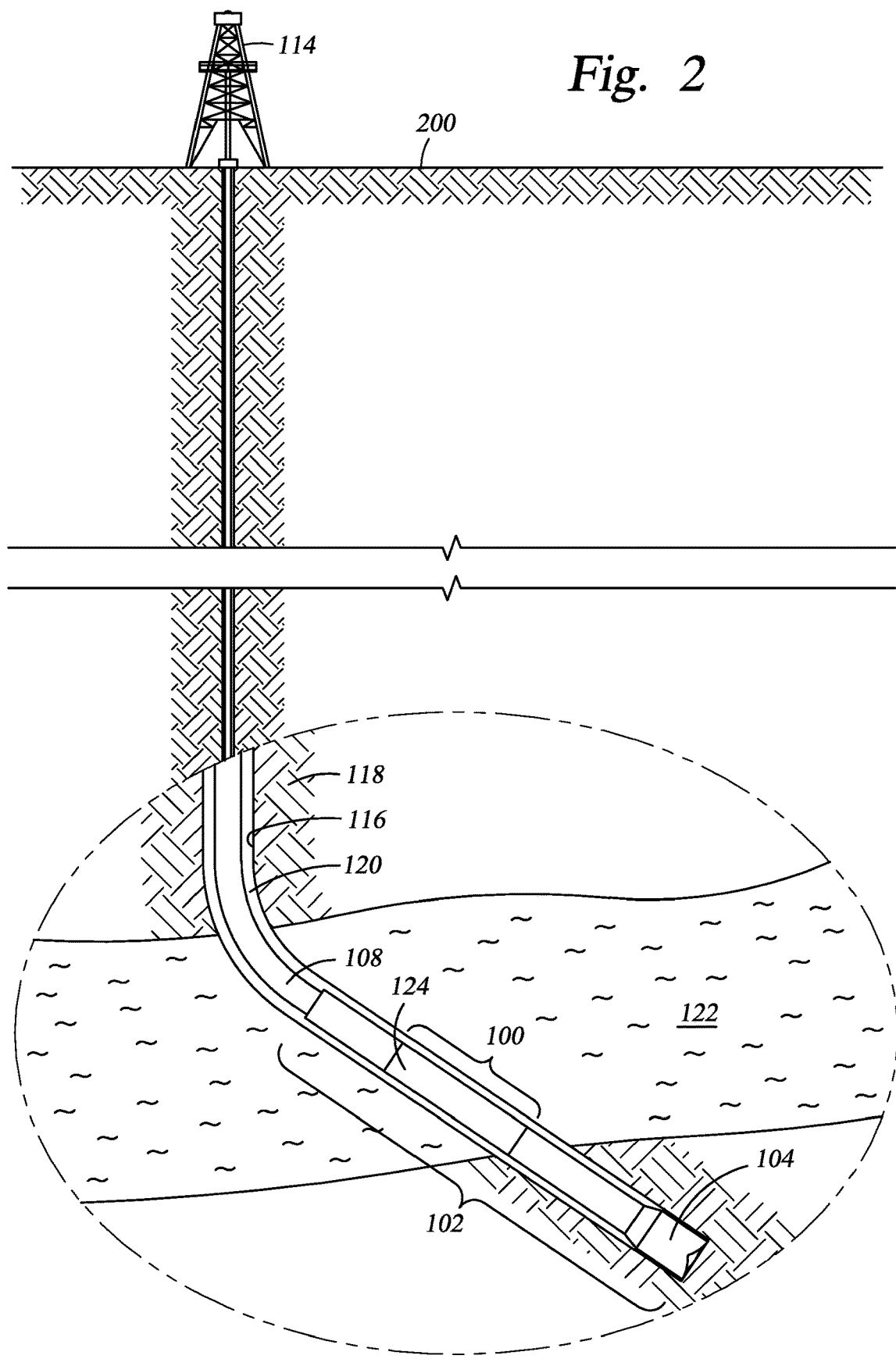
FIG. 2 shows a land-based drilling operation in accordance with at least some embodiments.

FIG. 2 shows bottomhole assembly 102 in use in a land-based drilling operation. In particular, the bottomhole assembly 102 again comprises formation evaluation tool 100 and drill bit 104. The bottomhole assembly 102 is lowered from the surface 200 by equipment associated with derrick 114. Drilling equipment supported within and around derrick 114 rotates the drill string 108 and the drill bit 104, causing the bit 104 to form a borehole 116 through the formation material 118.

Referring simultaneously to FIGS. 1 and 2, in some embodiments the information gathered by the formation evaluation tool 100 may be stored within the tool 100 and read when the formation evaluation tool 100 is raised to the platform 106 or raised to the surface 200. In other embodiments, some or all the information gathered by the tool may be sent to the platform 106 or surface 200 while the formation evaluation tool 100 is within the borehole 116. For example, some or all the information gathered by the formation evaluation tool 100 may be sent in encoded pressure pulses in the drilling fluid within the drill string 108. In yet still other embodiments, the information gathered by the formation evaluation tool 100 may be sent over a communication pathway embedded within the pipes of the drill string 108, such as by electrical conductors or optical conductors.

The formation evaluation tool 100 may be coupled within the bottomhole assembly 102 by any suitable mechanism. For example, in some embodiments the formation evaluation tool 100 has a threaded male "pin" end connector on one end, and a threaded female "box" end connector on the other end, such that the formation evaluation tool 100 couples to other components of the bottomhole assembly 102. In some cases, at least a portion of the outer surface 124 of the tool body forms a pressure vessel within which various components for generating neutrons and detecting gammas are located. Moreover, a fluid conduit (not visible in FIG. 1) may also reside within the outer surface 124, and drilling fluid passes through the fluid conduit on its journey to the drill bit 104.

Figure 3:
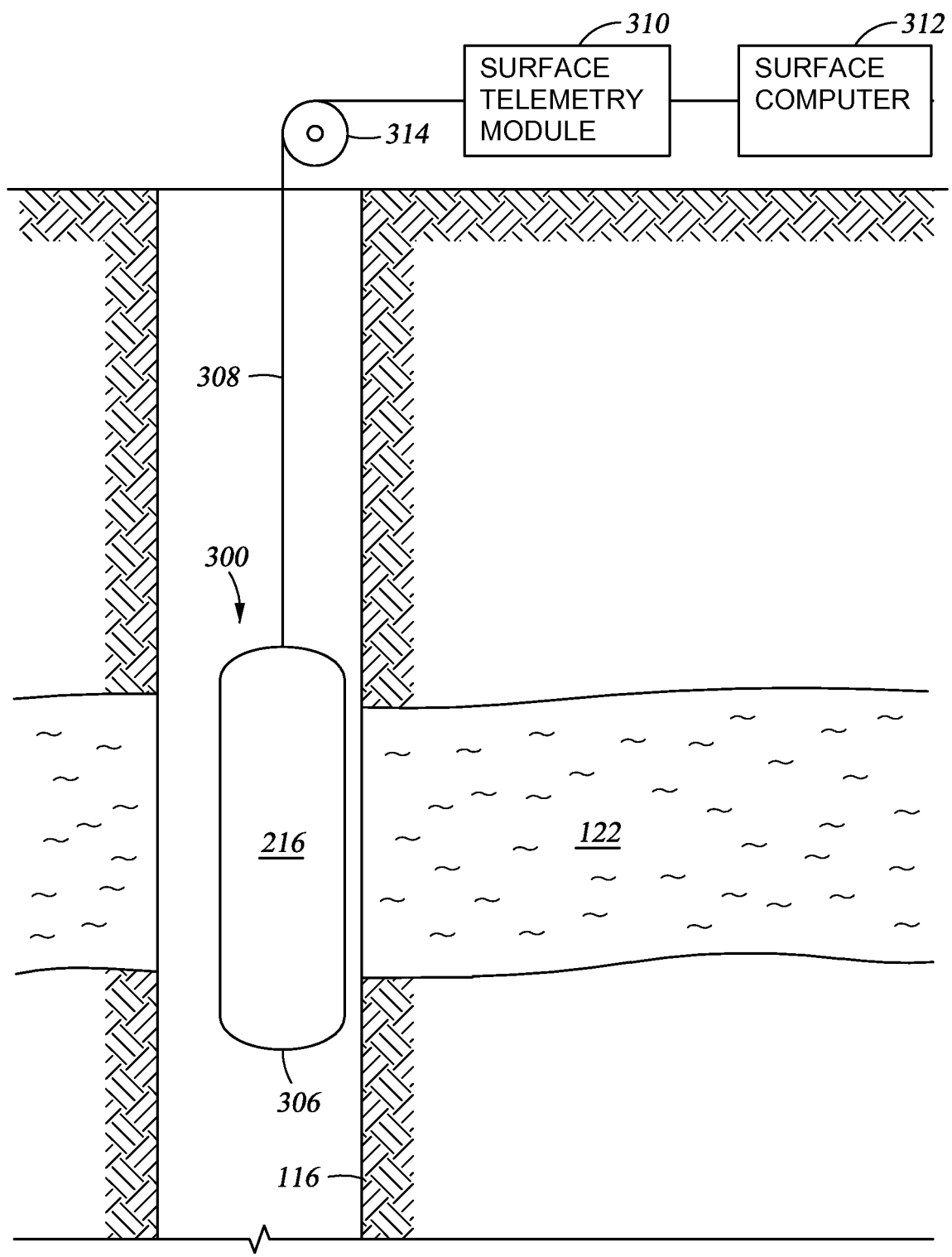
FIG. 3 shows a wireline logging operation in accordance with at least some embodiments.

While in some embodiments the formation evaluation tool is used in drilling operations, in yet still other embodiments the formation evaluation tool is used in wireline operations. In particular, FIG. 3 illustrates a wireline logging system that comprises a formation evaluation tool 300 placed within a borehole 116 proximate to a formation 122 of interest. The formation evaluation tool 300 comprises a tool body in the form of a pressure vessel 306 within which various subsystems of the formation evaluation tool 300 reside, and in the illustrative case of FIG. 3 the pressure vessel 306 is suspended within the borehole 116 by a cable 308. Cable 308, in some embodiments a multi-conductor armored cable, not only provides support for the pressure vessel 306, but also in these embodiments communicatively couples the formation evaluation tool 300 to a surface telemetry module 310 and a surface computer 312. The formation evaluation tool 300 may be raised and lowered within the borehole 116 by way of the cable 308, and the depth of the tool 300 within the borehole 116 may be determined by depth measurement system 314 (illustrated as a depth wheel). FIG. 3 is also illustrative of permanent or semi-permanent installations (e.g., installations within monitoring boreholes).

Figure 4:
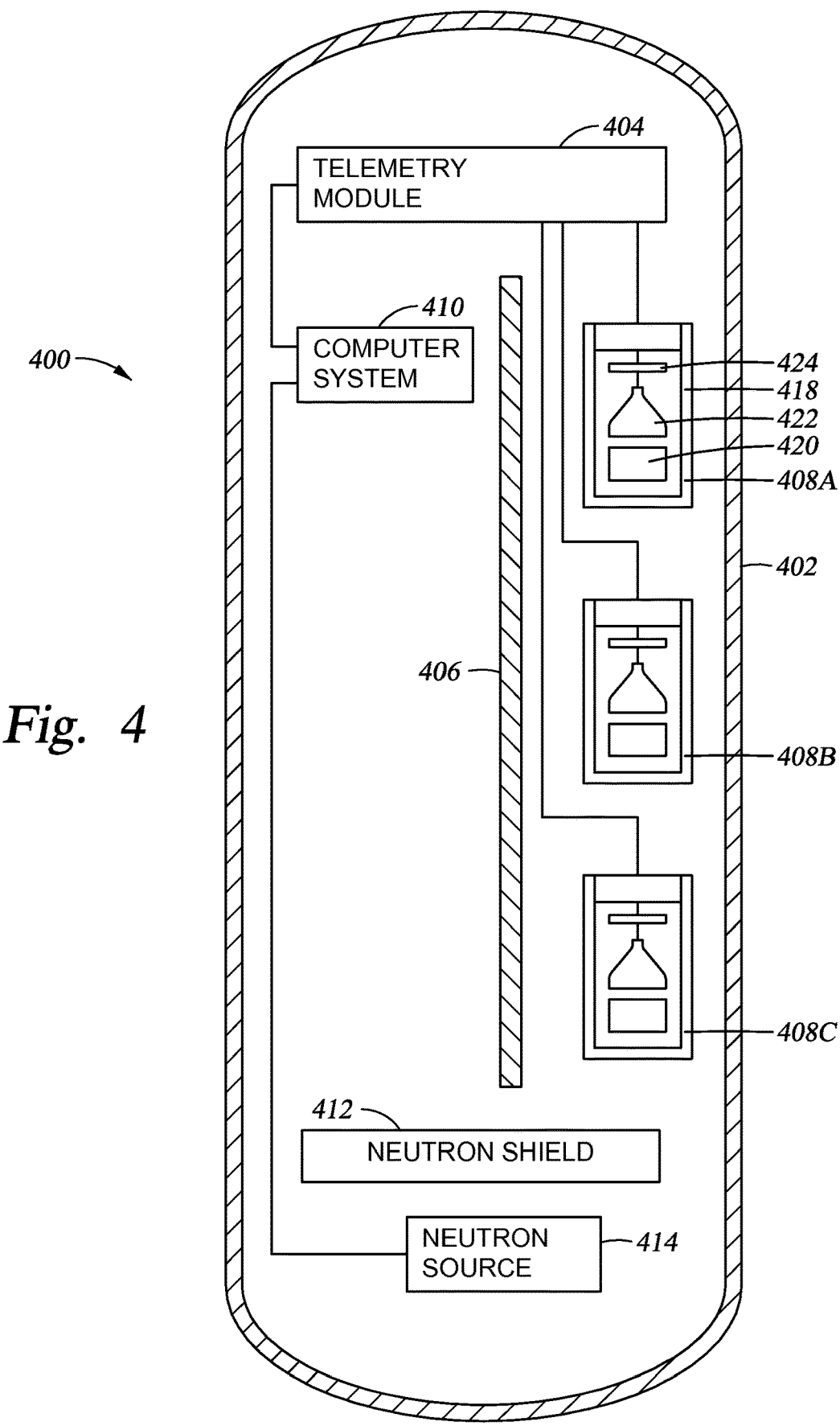
FIG. 4 shows a cross-sectional elevation view of a formation evaluation tool in accordance with at least some embodiments.

FIG. 4 shows a simplified partial cross-sectional view of a formation evaluation tool 400 in accordance with at least some embodiments. Formation evaluation tool 400 is illustrative of formation evaluation tool 100 in bottomhole assembly 102, wire-line formation evaluation tool 300, or permanent or semi-permanent logging installations. In particular, FIG. 4 illustrates that a pressure vessel 402 houses various components, such as a telemetry module 404, borehole shield 406, a plurality of gamma detectors 408 (in this illustrative case three gamma detectors labeled 408A, 408B and 408C), computer system 410, a neutron shield 412 and a neutron source 414. While the gamma detectors 408 are shown above the neutron source 414, in other embodiments the gamma detectors may be below the neutron source. Any suitable spacing between the gamma detectors 408 and the neutron source 414 may be used. Neutron shield 406 may make the gamma detectors 408 more likely to receive formation-sourced gammas (as opposed to borehole-sourced gammas), and the shield may be a high density material (e.g., HEVIMET® available from General Electric Company of Fairfield, Conn.).

The neutron source 414, under command from surface computer 312 in the case of wireline tools, or computer system 410 within the tool in the case of MWD, LWD or slickline tools, generates energetic neutrons. In order to reduce the irradiation of the gamma detectors 408 and other devices by energetic neutrons from the neutron source 414, neutron shield 412 (e.g., HEVIMET®) separates the neutron source 414 from the gamma detectors 204. Because of the speed of the energetic neutrons (e.g., 30,000 kilometers/second or more), and because of collisions of the neutrons with atomic nuclei that change the direction of movement of the neutrons, a neutron flux is created around the formation evaluation tool 400 that extends into the formation.

Neutrons generated and/or released by the source 210 interact with atoms by way of inelastic collisions and/or thermal capture. In the case of inelastic collisions, a neutron inelastically collides with atomic nuclei, a gamma is created (an inelastic gamma), and the energy of the neutron is reduced. When high-energy neutrons scatter with lighter earth elements, such as Hydrogen, the energy loss may be quite large. The neutron may have many inelastic collisions with the atomic nuclei, each time creating an inelastic gamma and losing energy. At least some of the gammas created by the inelastic collisions are incident upon the gamma detectors 408.

Still referring to FIG. 4, and particularly to the far gamma detector 408A as illustrative of all three gamma detectors 408, a gamma detector in accordance with at least some embodiments comprises an enclosure 418 (shown in cross-section), and within the enclosure 418 resides: a crystal 420 (e.g., sodium iodide scintillation crystal, bismuth germinate scintillation crystal); a photo multiplier tube 422 in operational relationship to the crystal 420; and a processor 424 coupled to the photomultiplier tube 422. As gammas are incident upon/within the crystal 420, the gammas interact with the crystal 420 and flashes of light are emitted. Each flash of light itself is indicative of an arrival of a gamma, and the intensity of light is indicative of the energy of the gamma. The output of the photomultiplier tube 422 is proportional to the intensity of the light associated with each gamma arrival. The processor 424 quantifies the output as gamma energy and relays the information to a surface computer system (e.g., computer system 312 in FIG. 3) and/or a computer system within the tool (e.g., the computer system 410 in FIG. 4, as might be the case in the case of measuring-while-drilling (MWD), logging-while-drilling (LWD) or slickline tools).

Figure 5:
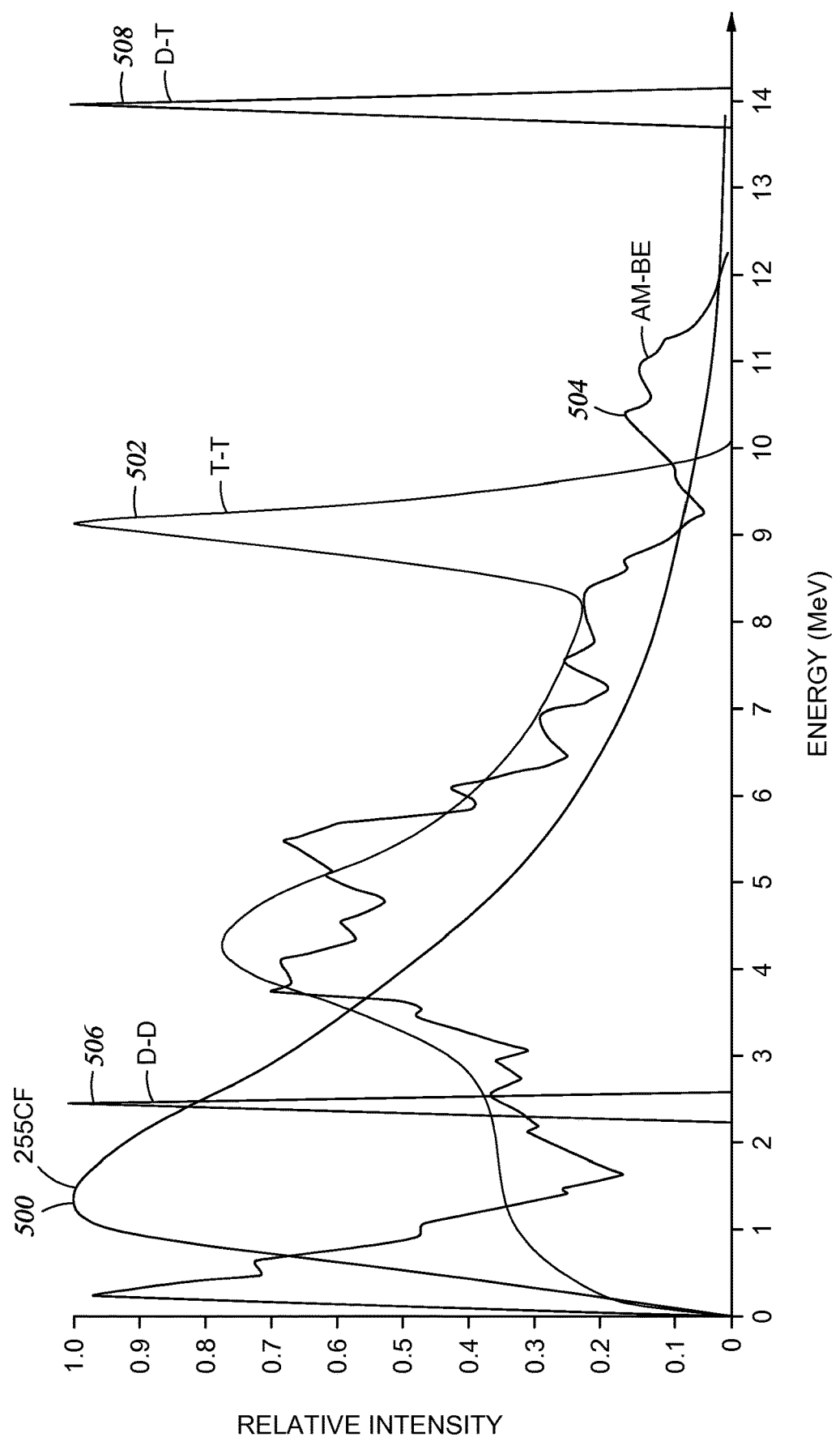
FIG. 5 shows a graph of a plurality of characteristic energy spectra in accordance with at least some embodiments.

In the related-art, a neutron source within a formation evaluation tool is limited to creating or releasing neutron bursts having a single characteristic energy spectra. FIG. 5 shows a graph of relative intensity of neutrons created or released (Y-axis) against energy of the neurons (X-axis, in Mega-electron Volts (MeV)). For example, a 252Cf (Californium) chemical source releases neutrons with characteristic energy spectra 500 that peaks at relatively low energy, and has a somewhat exponential decay across the energy spectrum. By contrast, an accelerator-type source creating tritium-tritium (T-T) collision reactions produces a neutron bursts with characteristic energy spectra 502 with a first peak in the 4 MeV range, and a spike in the 9 MeV range. As a further example, a spontaneous Americium-Beryllium source produces neutron bursts with characteristic energy spectra 504 that, to some extent, matches the spectra 502, but more ragged and without the spike at about 9 MeV. An accelerator-type source creating deuterium-deuterium (D-D) collision reactions produces neutron bursts with characteristic energy spectra 506 being a spike at about 2.5 MeV. An accelerator-type source creating deuterium-tritium (D-T) collision reactions produces neutron bursts with characteristic energy spectra 508 being a spike at about 14 MeV. The point is that related-art neutron sources are limited to a single characteristic energy spectra.

However, in many cases downhole characteristic to be evaluated may respond differently, and in some cases better, to interrogation by neutron bursts having different characteristic energy spectra. For example, better evaluation of the formation matrix material may take place with interrogation by a neutron burst with a first characteristic energy spectra. The first characteristic energy spectra may not be as favorable, however, for evaluation of formation fluids within the formation matrix, and thus a second characteristic energy spectra may provide better evaluation. Similarly, evaluation of borehole constituents may be performed with better accuracy if the neutron bursts have a third characteristic energy spectra, different than the first and second characteristic energy spectra. The related-art systems individually do not address the issues. Either an evaluation is made with an inferior characteristic energy spectra, or a completely different logging tool is used, the logging tool having a different neutron source.

The issues noted above are addressed, at least in part, by a neutron source that has the ability to generate neutron bursts having selectively different characteristic energy spectra. In some cases, a first neutron burst having a first characteristic energy spectra can be created, and within one second or less a second neutron burst can be created having a second characteristic energy spectra different than the first. The specification first turns to a high level description of the various systems, with a specific example neutron tube discussed later.

Figure 6:
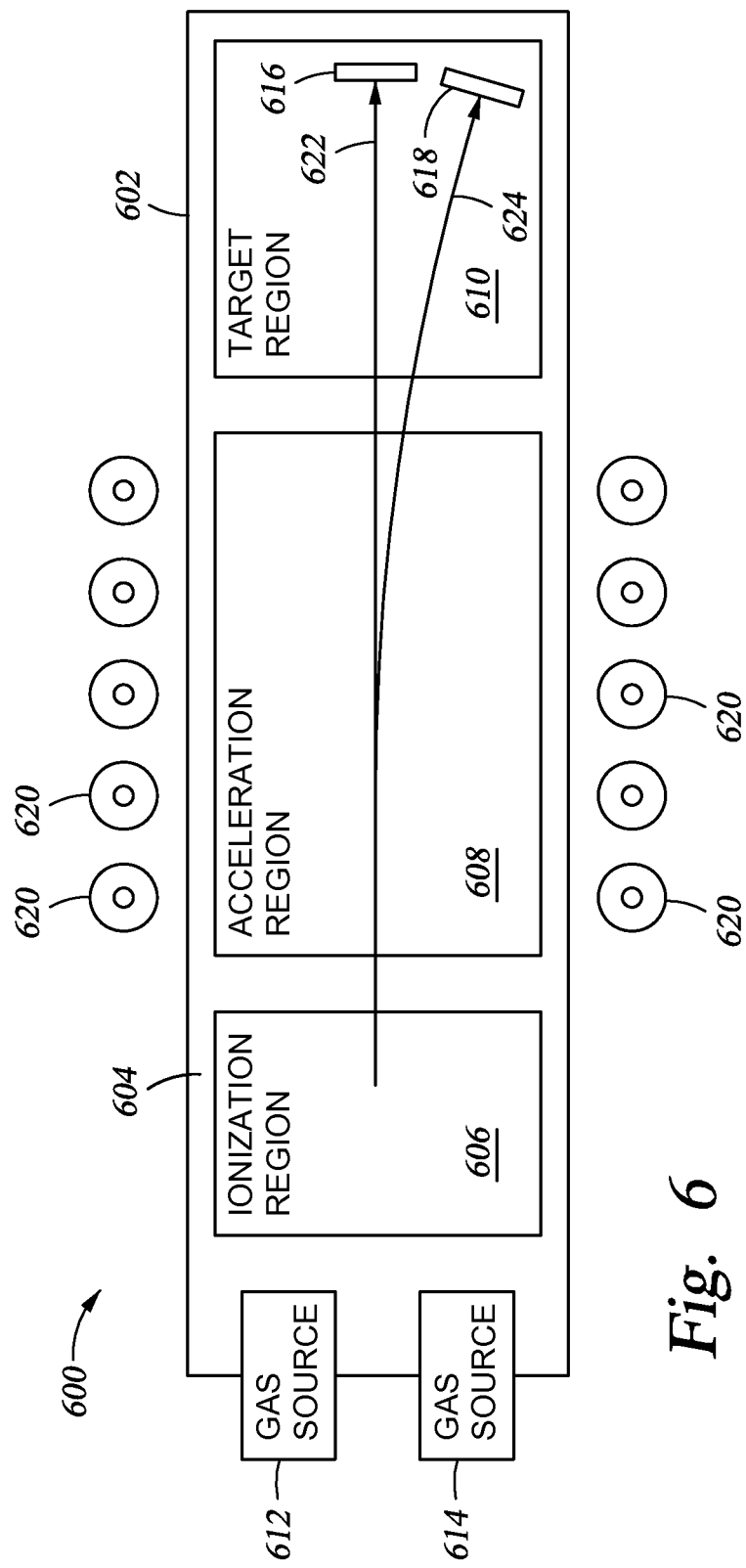
FIG. 6 shows a block diagram of a neutron tube in accordance with at least some embodiments.

FIG. 6 shows a block diagram view of a neutron tube in accordance with at least some embodiments. In particular, FIG. 6 shows a neutron tube 600 comprising a housing 602 within which various components of the neutron tube 600 resides. The housing 602 defines an internal volume 604 that resides at a pressure less than atmospheric (i.e., a negative gauge pressure, under a vacuum), and in some cases the pressure within the internal volume may be in the range of 0.1 to 0.01 Torr or below. Several logical regions exist within the neutron tube 600, including an ionization region 606, an acceleration region 608, and a target region 610. Moreover, a neutron tube 600 in the example system has at least one, and in some cases two, gas sources 612 and 614, the gas sources defining a source region. Each of the regions will be discussed in turn.

Gas source 612 may be any suitable system or structure for releasing or providing a gas into the internal volume 604 of the housing 602. In one example system, the gas source 612 comprises an external tank of gas fluidly coupled to the internal volume 604 through a control valve. In another example system, the gas source 612 may be a metallic structure disposed within the internal volume 604 and impregnated with atoms of a source gas. In the example case of a metallic structure in the form of a wire impregnated with atoms of a source gas, the source gas is released from the wire by heating the wire with electrical current and thus driving the impregnated source gas out of and/or off the wire and into the internal volume 604. Gas source 614 may be of similar constructions.

In some example systems, gas source 612 may be source of deuterium gas, while gas source 614 may be a source of tritium gas. In the case of gas source 612 being a wire impregnated with the atoms of the source gas, the wire may be a titanium wire impregnated with deuterium such that, when the wire is heated by way of electrical current, deuterium is driven from the wire into the internal volume 604. In the case of gas source 614 being a wire impregnated with the atoms of the source gas, the wire may be a zirconium wire impregnated with tritium such that, when the wire is heated by way of electrical current, tritium is driven from the wire into the internal volume 604. In some example operational scenarios, the gas sources 612 and 614 are operated or activated mutually exclusively—either gas source 612 is used, or gas source 614 is used, but not both.

One additional feature of note regarding the gas sources as impregnated metallic wires, once the temperature of the wire returns to ambient the wires are capable of re-absorbing free gas within the internal volume 604. For example, deuterium may be driven from the gas source 612 in the form of the titanium wire by heating, but as the wire returns to ambient temperature the titanium wire tends to re-absorb deuterium gas atoms. Similarly, tritium may be driven from the gas source 612 in the form of the zirconium wire by heating, but as the wire returns to ambient temperature the zirconium wire tends to re-absorb tritium gas atoms. Thus, in some example operational scenarios the neutron tube may switch between source gases. Depending on the volume defined by the internal volume and the rate at which gas is consumed in the accelerator reactions, suitable switching between source gas may take place in 10 minutes or less without the need to evacuate the internal volume 604 by external vacuum pumps (i.e., the source gas switch can be performed with the neutron tube 600 disposed downhole in a formation evaluation tool).

Still referring to FIG. 6, the next region of interest is the ionization region 606. As the name implies, it is within the ionization region 606 that gas within the housing 602 is ionized to create ionized gas. Any of a variety of ionization techniques may be used, such as high voltage carbon nano-tubes, electrical field ionization, and/or plasma creation based on application of high frequency electromagnet energy to the ionization region 606. That is to say, within the ionization region 606 will reside an ionization structure designed and constructed to create ions of the source gas.

The acceleration region 608 draws ionized gases from the ionization region 606, and accelerates the ionized gases into the target region 610 where collision reactions take place. Acceleration within the acceleration region 608 takes advantage of the ionized state of the source gas and, by way of an electric field exerts forces on the ionized gases which accelerate the ionized gases. The electric field is arranged such that the field is aligned with the direction of travel of the ionized gasses toward the target region 610. It follows that an acceleration structure is disposed within the acceleration region 606 to create and/or sustain the electric field.

Finally, the target region 610 is the region within which one or more target materials are located, for example target materials 616 and 618. Ionized gasses accelerated into the target region 610 are incident upon, or impinge on, one or more stationary target materials. The interaction between the ionized gasses and the target material generate fusion reactions that create neutrons as a byproduct— hence the neutron bursts.

In accordance with example systems, the neutron tube 600 is cable of generating neutron bursts having a first characteristic energy spectra, and also generating neutron bursts having a second characteristic energy spectra different than the first characteristic energy spectra. In some cases, the change in characteristic energy spectra is based on a change in source gas. That is, for neutron bursts with the first characteristic energy spectra, a first source gas may be used (e.g., released into to the internal volume, or driven from an impregnated wire disposed within the internal volume 604), and then a switch is made to a second source gas, all other physical attributes held constant. If the first gas source 612 is a deuterium source, the second gas source 614 is a tritium source, and the target material 616 is a deuterated target (i.e., impregnated with deuterium), then a neutron tube 600 may selectively create deuterium-deuterium collision reactions and tritium-deuterium collision reactions. Likewise, if the first gas source 612 is a deuterium source, the second gas source 614 is a tritium source, and the target material 616 is a tritiated target (i.e., impregnated with tritium), than a neutron tube 600 may selectively create deuterium-tritium collision reactions and tritium-tritium collision reactions.

In some example systems, the time frames associated with switching between source gases to implement changes in characteristic energy spectra may be sufficient. For example, it may take approximately 10 minutes or less for the one metallic wire to absorb remaining free gas sufficiently before heating the second metallic structure. However, in other cases, time frames on the order of minutes for switching between source gases to implement changes in characteristic energy spectra may not be suitable. For example, if multiple types of interrogation are desired at each incremental depth in well bore, changes that take place on the order of minutes may make a logging run impractically long. Moreover, in the case of "while-drilling" operations, changes that take place on the order of minutes may be too long in relation to movement of the drill string.

Thus, in accordance with yet still further example systems, the neutron tube 600 implements systems that enable switching between characteristic energy spectra in time frames of one second or less. In accordance with the example system, the acceleration region 608 is designed and constructed such that a magnetic field is applied within the acceleration region 608 (in addition to the electric field used to the accelerate the ionized gases). In some cases, the field strength of the magnetic field may be controllable. Application of a controllable magnetic field in the acceleration region enables the neutron tube 600 to direct accelerated ionized gasses to selected target material so as to control the collision reaction type, and thus control the characteristic energy spectra of neutron bursts created by the neutron tube 600.

Still referring to FIG. 6, an example neutron tube 600 may thus comprise a magnetic field within the acceleration region 608, the magnetic field illustrated by field symbols 620. The example field symbols are shown outside the housing 602 so as not to unduly complicate the figure. In practice, the magnetic field permeates the acceleration region 608. The magnetic field is oriented transverse to the direction of travel of the ionized gases, illustrative travel paths shown by lines 622 and 624. That is, in the view of FIG. 6 the magnetic field lines are perpendicular to the page, while the travel paths shown by lines 622 and 624 are within the plane of the page. When the magnetic field strength is zero, ionized gasses experience acceleration along a linear path 622; however, in the presence of a magnetic field, the ionized gases experience acceleration along a deflected path, such as deflected path 624. Thus, in the example embodiments of FIG. 6 the target material 616 is disposed within the internal volume 604 along a linear path in relation to the acceleration region. Correspondingly, the target material 618 is disposed within the internal volume 604 along a deflected path in relation to the acceleration region 608.

Consider a situation where the field strength of the magnetic field may be controlled in an "on-off" sense. That is, either the field strength is zero (and thus ionized gases are accelerated along the linear path) or the field strength is non-zero (and thus the ionized gases are accelerated along the deflected path). It is noted that switching between zero field strength and a non-zero field strength may take place very quickly (in relation to switching source gases), and in some cases the switching time is limited only by how quickly the current flow through an electromagnetic can be changed and/or the physical location of a permanent magnet changed.

Figure 7:
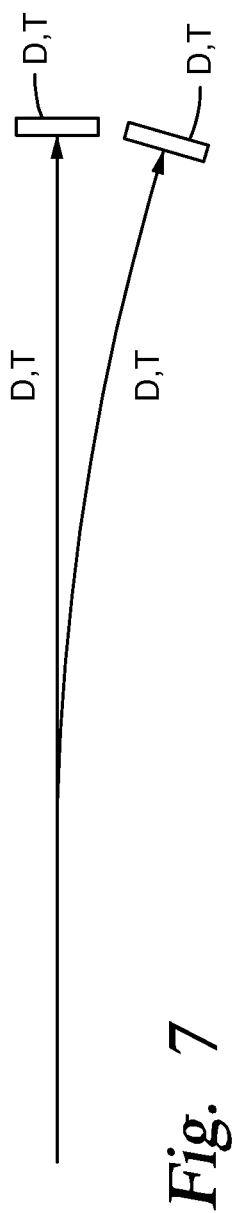
FIG. 7 shows, in shorthand notation, example collision reactions in accordance with at least some embodiments.

There are several possible operational scenarios associated with the example system of FIG. 6 where the magnetic field strength is controlled in an "on-off" sense. FIG. 7 shows a simplified elevation view of the ionized gas paths and the target material to illustrate the variation possible. In particular, FIG. 7 shows that the linear path could be of ionized deuterium (D) or ionized tritium (T). Likewise, FIG. 7 shows that the deflected path could be of ionized deuterium (D) or ionized tritium (T). The target material linearly aligned with the acceleration region could be impregnated with either deuterium (D) or tritium (T), and likewise the target material along the deflected path could be impregnated with either deuterium (D) or tritium (T). Thus, in the example system the following collision reactions are possible: deuterium-deuterium reactions; deuterium-tritium reactions; tritium-deuterium reactions; and tritium-tritium reactions. It is noted that, for the same magnetic field strength, the deflection of a deuterium ion and a tritium ion will be different, and thus FIG. 7 should not be read to imply that the deuterium ions and the tritium ions would travel along the same deflected path.

Figure 8:
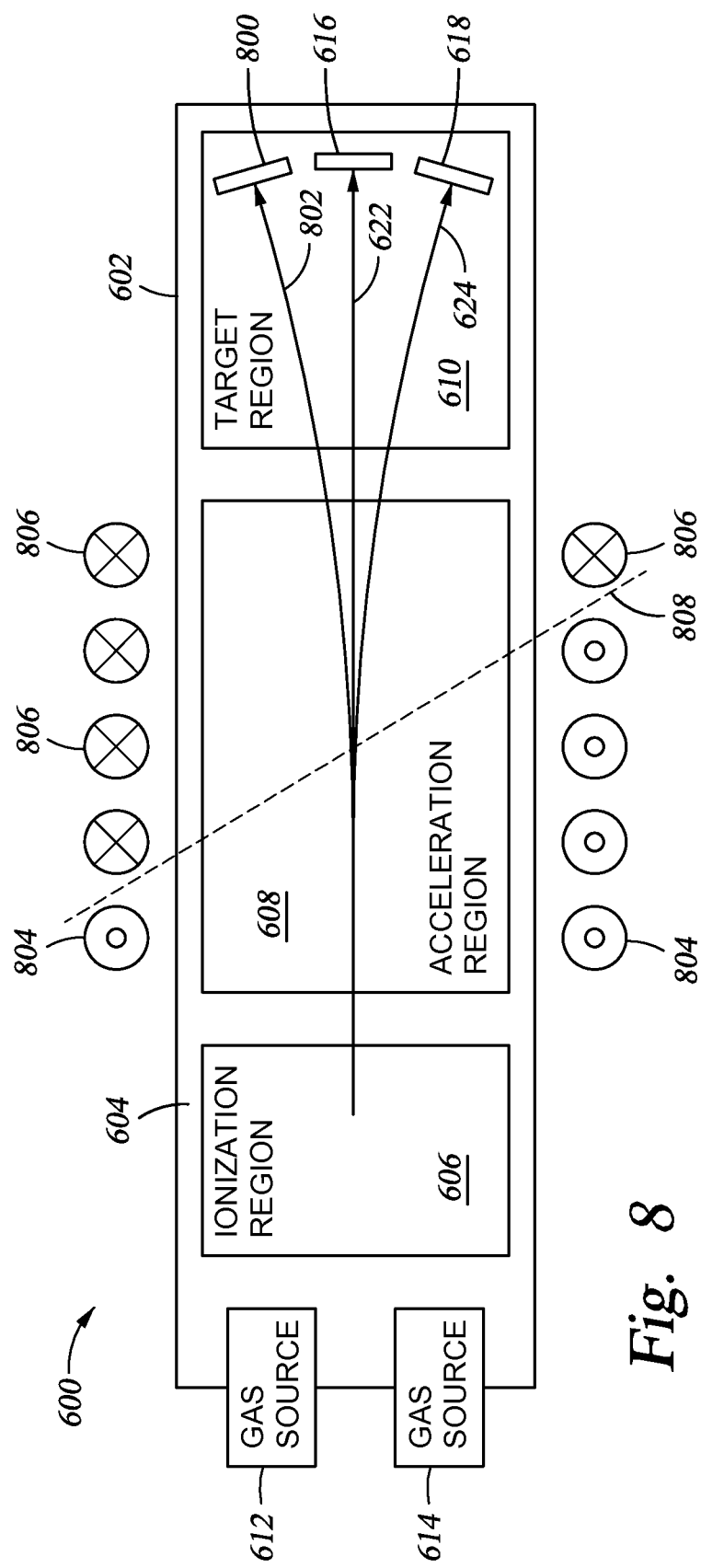
FIG. 8 shows a block diagram of a neutron tube in accordance with at least some embodiments.

The specification now turns to an example system where the magnetic field strength is controllable not only in an "on-off" sense, but also the polarity of the magnetic field may be selectively reversed. FIG. 8 shows a block diagram view of a neutron tube 600 in accordance with other example systems. The high level description of the gas sources 612 and 614, the ionization region 606, the acceleration region 608, and the target region 610 are the same as with respect to FIG. 6, and thus will not be repeated here. However, the target region 610 comprises not only the target materials 616 and 618, but also a third target material 800.

In accordance with the example system of FIG. 8, the neutron tube 600 is capable of generating neutron bursts having multiple characteristic energy spectra. As before, in some cases the change in characteristic energy spectra is based on a change in source gas, but in other cases the neutron tube 600 implements systems that enable switching between characteristic energy spectra in time frames of one second or less based on not only "on-off" control of the magnetic field applied within the acceleration region but also selective control of the polarity of the magnetic field. In accordance with the example system, the acceleration region is designed and constructed such that a magnetic field having a first polarity is applied within the acceleration region 608, the magnetic field of the first polarity illustrated by field symbols 804. As before, the example field symbols are shown outside the housing 602 so as not to unduly complicate the figure, but in practice the magnetic field permeates the acceleration region 608. Further, the acceleration region is designed and constructed such that a magnetic field having a second polarity (opposite the first polarity) may be selectively applied within the acceleration region 608, the magnetic field of the second polarity illustrated by field symbols 806. The slash 808 ("\") through the figure signifies that the polarity is selectively controllable.

The magnetic field (regardless of polarity) is oriented transverse to the direction of travel of the ionized gases, with illustrative travel paths shown by lines 622, 624, and 802. That is, in the view of FIG. 8 the magnetic field lines (regardless of polarity) are perpendicular to the page, while the travel paths shown by lines 622, 624, and 802 are within the plane of the page. When the magnetic field strength is zero, ionized gasses experience acceleration along a linear path 622; however, in the presence of a magnetic field having the first polarity, the ionized gases experience acceleration along a deflected path, such as deflected path 624. In the presence of a magnetic field having the second polarity, the ionized gases experience acceleration along a deflected path, such as deflected path 802. Thus, in the example embodiments of FIG. 8 the target material 616 is disposed within the internal volume 604 along a linear path in relation to the acceleration region. The target material 618 is disposed within the internal volume 604 along a deflected path in relation to the acceleration region 608. Target material 800 is disposed along a deflected path 802 in relation to the acceleration region, where the deflected path 802 is an opposite deflection from the deflected path 624.

"On-off" control of the magnetic field has the same considerations as discussed with the respect to FIG. 6. Change of polarity of the magnetic field may take place by reversing the direction of current flow through an electromagnet. It is noted that switching between magnetic field strength having a first polarity and a magnetic field strength having a second polarity may take place very quickly (in relation to switching source gases), and in some cases the switching time is limited only by how quickly the current flow through an electromagnetic can be reversed (e.g., taking into account inductive effects, and perhaps hysteresis associate within any magnetic core material).

Figure 9:
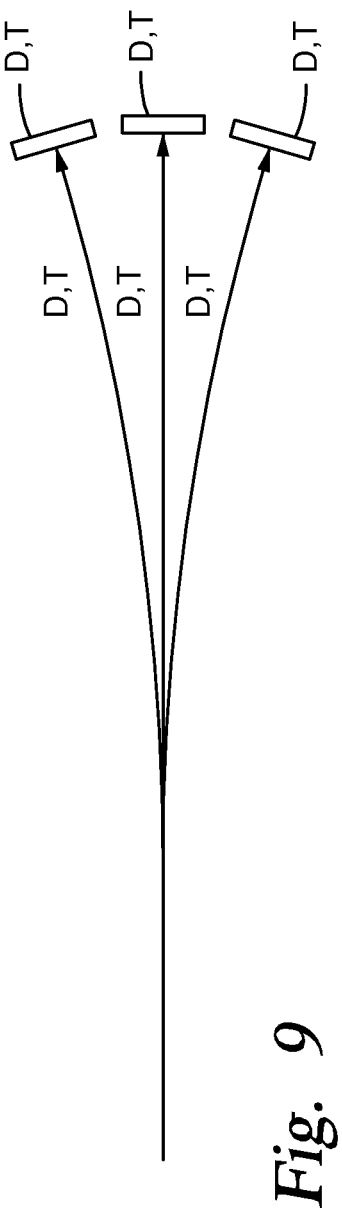
FIG. 9 shows, in shorthand notation, example collision reactions in accordance with at least some embodiments.

There are several possible operational scenarios associated with the example system of FIG. 8 where the magnetic field strength is controlled in not only in an "on-off" sense, but also polarity controlled. FIG. 9 shows a simplified elevation view of the ionized gas paths and the target material to illustrate the variations possible. In particular, FIG. 9 shows that the linear path could be of ionized deuterium or ionized tritium. Likewise, FIG. 9 shows that the deflected paths each could be of ionized deuterium or ionized tritium. Each of the target materials could be impregnated with either deuterium or tritium. Thus, in the example system the following collision reactions are possible: deuterium-deuterium reactions; deuterium-tritium reactions; tritium-deuterium reactions; and tritium-tritium reactions. In the example systems of FIG. 8 additional targets may be placed so that, not only can a target materials of particular impregnation can be selected, but one or more spare target material can be present in the event of target depletion For example, a system may selectively choose the target 616 or the target 618. If one target is subject to early depletion, the third target material 800 may be selected at the design stage to be a duplicate impregnation to the target subject to depletion, and thus the third target material 800 selected later in the life of the neutron tube 600. Again, for the same magnetic field strength, the deflection of a deuterium ion and a tritium ion will be different, and thus FIG. 9 should not be read to imply that the deuterium ions and the tritium ions would travel along the same deflected path.

Figure 10:
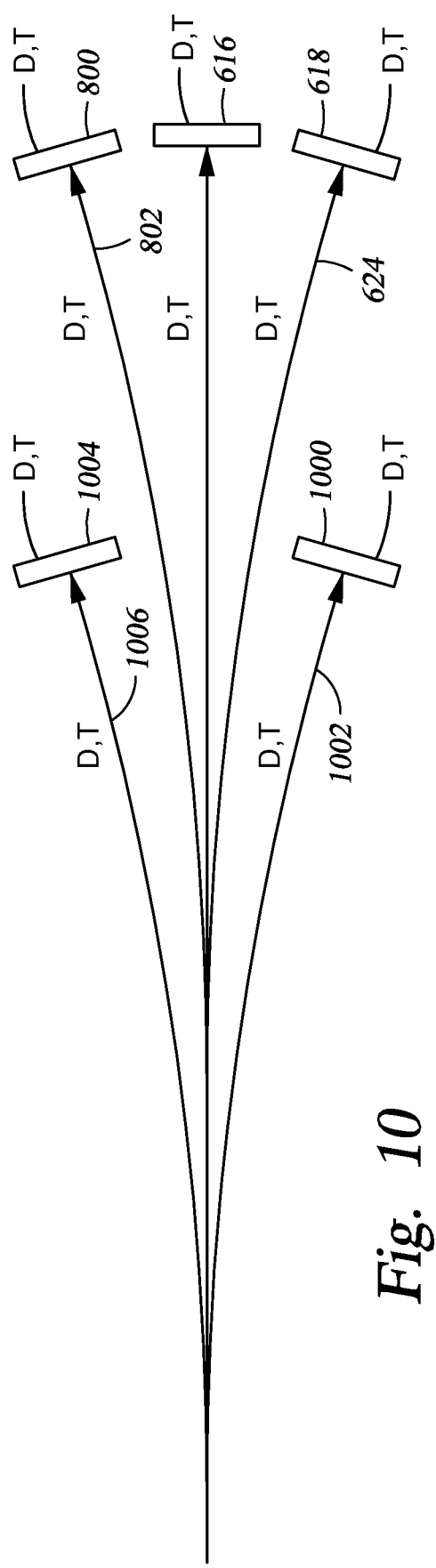
FIG. 10 shows, in shorthand notation, example collision reactions in accordance with at least some embodiments.

The specification now turns to an example system where not only the magnetic field is selectively controllable in an "on-off" sense, and selectively controllable in a polarity sense, but also the magnetic field strength is selectively controllable in a magnitude sense. The structure of such a neutron tube is approximately the same as FIGS. 6 and/or 8, and so as not to unduly complicate the description the third example variation is illustrated only in the shorthand notations similar to FIGS. 7 and 9. FIG. 10 shows a simplified elevation view of the ionized gas paths and the target materials to illustrate the variations possible when the magnetic field is controllable: in an "on-off" sense; in a polarity sense; and in a magnitude sense. In particular, FIG. 10 shows that an example neutron tube may have multiple target materials along multiple deflected paths in relation to the acceleration region. Thus, not only are the example target materials 616, 618, 800 present (in their respective linear path, first deflected path, and second deflected path), but also target material 1000 is present in a deflected path 1002 (of smaller radius that deflected path 624), along with target material 1004 in a deflected path 1006 (of smaller radius that deflected path 802).

The direction of deflection of each deflected path is selectively controllable based on the polarity of the magnetic field applied to the acceleration region. The radius of each deflected path is selected based on the magnitude of the magnetic field strength. Thus, for example, as between deflected path 624 and deflected path 1002, the polarity of the magnetic field is the same, but a greater magnetic field strength results in a smaller radius of curvature.

"On-off" control of the magnetic field has the same considerations as discussed with the respect to FIGS. 6 and 8. Change of polarity of the magnetic field has the same considerations as discussed with the respect to FIG. 8. Changing magnetic field strength may likewise take place very quickly (in relation to switching source gases), and in some cases the switching time is limited only by how quickly the magnitude of the electrical current flow through an electromagnet can be changed (e.g., taking into account inductive effects of the electromagnet).

There are several possible operational scenarios associated with an example system illustrated by FIG. 10. FIG. 10 shows that each path (linear or deflected) could be of ionized deuterium or ionized tritium. Likewise, FIG. 10 shows that the each of the target materials could be impregnated with either deuterium or tritium. Thus, in the example system the following collision reactions are possible: deuterium-deuterium reactions; deuterium-tritium reactions; tritium-deuterium reactions; and tritium-tritium reactions. In the example systems of FIG. 10 additional targets may be placed so that, not only can a target material of particular impregnation can be selected, but multiple spare target materials can be present in the event of target depletion. Again, for the same magnetic field strength, the deflection of a deuterium ion and a tritium ion will be different, and thus FIG. 9 should not be read to imply that the deuterium ions and the tritium ions would travel along the same deflected path. The fact that the magnitude of deflection of deuterium ions is different (i.e., greater) than the magnitude of deflection of tritium ions for the same applied magnetic field strength and polarity (assuming magnitude is non-zero) leads to yet still further operational examples.

In the example systems discussed above it has been implicitly assumed that the sources of gas are used mutually exclusively. However, in yet still further example operational states the neutron tube 600 may use both sources of gas simultaneously. That is, both deuterium gas and tritium gas may be present in the internal volume 604, and thus simultaneously ionized deuterium and ionized tritium may be created. As mentioned a few times above, however, deuterium ions are deflected more than the tritium ions for the same magnetic field strength, and this fact thus leads to operational scenarios where both gases are used simultaneously and impinge upon different target materials.

Figure 11:
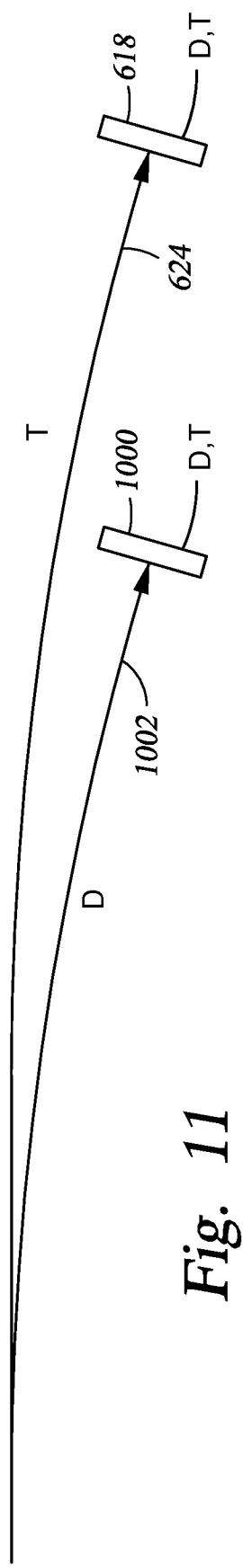
FIG. 11 shows, in shorthand notation, example collision reactions in accordance with at least some embodiments.

The structure of a neutron tube that utilizes differences in deflection as between deuterium ions and tritium ions is approximately the same as FIGS. 6 and/or 8, and so as not to unduly complicate the description the fourth example variation is illustrated only in the shorthand notations similar to FIGS. 7, 9, and 10. FIG. 11 shows a simplified elevation view of the ionized gas paths and target materials to illustrate the variations possibilities for simultaneous use of source gas. In particular, FIG. 11 shows that an example neutron tube may have multiple target materials along multiple deflected paths in relation to the acceleration region. In this example, target materials 618 and 1000 are shown (but it is noted that some or all the additional targets noted in FIG. 10 may likewise be present).

In the particular example, tritium ions may be deflected along the deflected path 624, while for the same magnetic field strength and polarity the deuterium ions may be deflected along the deflected path 1002. Here, the radius of each deflected path is based on the mass of each ion, with tritium being of greater mass and thus experiencing less deflection. There are several possible operational scenarios associated with an example system illustrated by FIG. 11. FIG. 11 shows one deflected path of ionized deuterium and the other deflected path of ionized tritium. Likewise, FIG. 10 shows that the each of the target materials could be impregnated with either deuterium or tritium. Thus, in the example system the following simultaneous reactions are possible: deuterium-deuterium reactions and tritium-tritium reactions; deuterium-deuterium reactions and tritium-deuterium reactions; deuterium-tritium reactions and tritium-tritium reactions; and deuterium-tritium reactions and tritium-deuterium reactions. It is noted that in the simple case of FIG. 11 (i.e., no linear target material, and no target materials on deflected path using opposite polarity magnetic field), that a permanent magnet rather than an electromagnet could be used to provide the magnetic field to the acceleration region.

Figure 12:
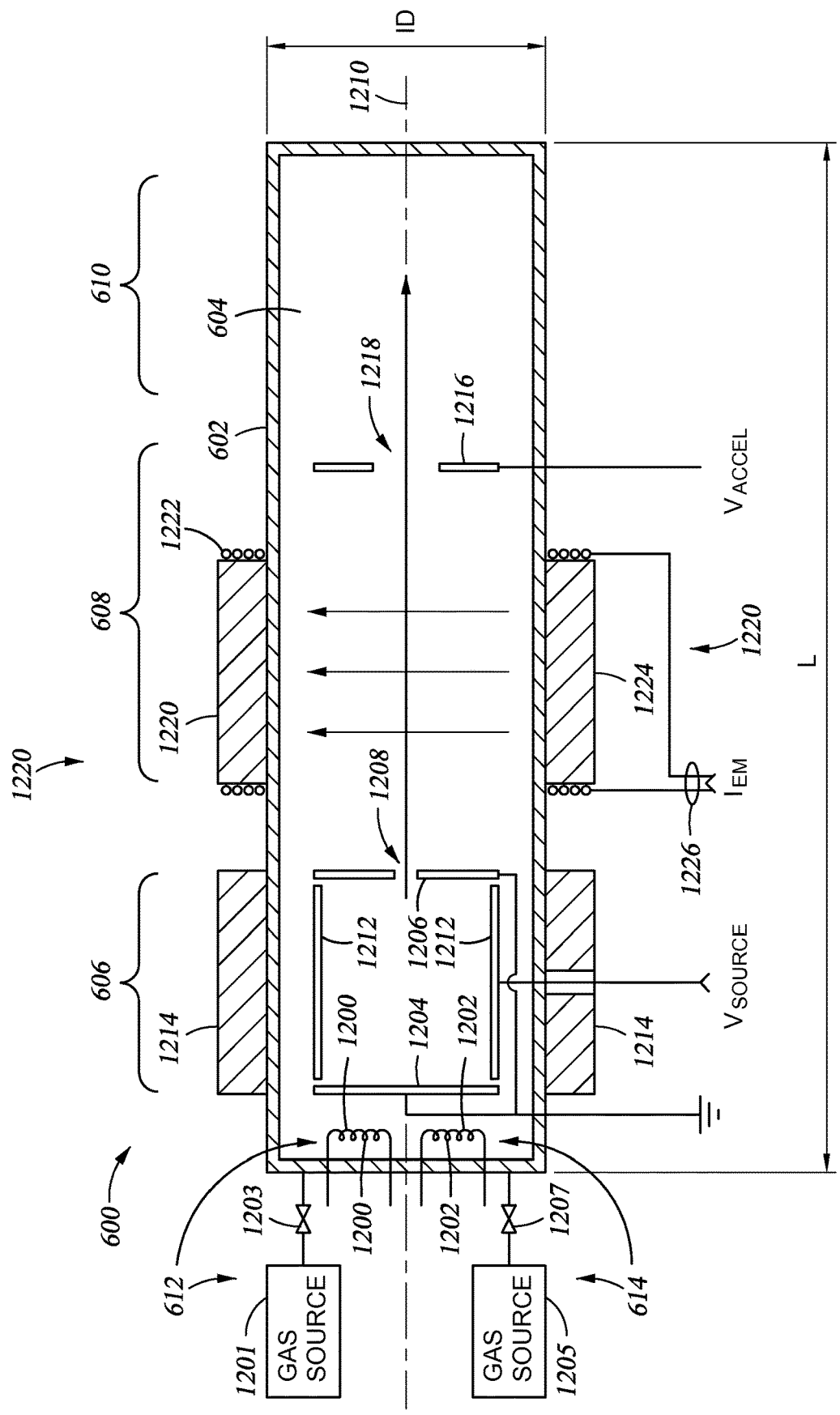
FIG. 12 shows a cross-sectional elevation view of a neutron tube in accordance with at least some embodiments.

The specification now turns to an example neutron tube construction. FIG. 12 shows a cross-sectional elevation view of a neutron tube in accordance with at least some embodiments. In particular, the neutron tube 600 comprises the ionization region 604, the acceleration region 608, and the target region 610. In this example view the neutron tube 600 is "turned" (in relation to FIGS. 6 and 8) in the sense that the magnetic field within the acceleration region is now parallel to the plane of the page so as to better show the electromagnet orientation. It follows the deflected paths deflect into or out of the page, and thus are not expressly shown.

The housing 602 defines the internal volume 604. The housing 602 may be constructed of any suitable material (e.g., glass, or ceramic). In some example systems, the housing may define an axial length L on the order of about six inches, and define an internal diameter (ID) on the order of one inch. The various regions within the neutron tube 600 are defined by structures inside the internal volume, and in some cases both inside and outside the internal volume.

Metallic wire 1200 may be a deuterium impregnated titanium wire to be gas source 612. Though the metallic wire is shown to have multiple loops within the internal volume, such is not strictly required, as a single "loop" within the internal volume may be sufficient depending on factors such as the size of the neutron tube and/or the expected life. Similarly, metallic wire 1202 may be a tritium impregnated zirconium wire to be gas source 614. Though the metallic wire 1202 is shown to have multiple loops, a single "loop" within the internal volume may be sufficient. By selectively heating (e.g., by applying electrical current flow) the metallic wires 1200 and/or 1202, gas may be released inside the neutron tube 600.

FIG. 12 also shows example variations for the gas sources. For example, gas source 612 could alternatively be a vessel or tank 1201 filled with gas, and control valve 1203, such that gas within the tank 1201 is selectively released into the internal volume 604. Likewise, gas source 614 could alternatively be a vessel or tank 1205 filled with gas (different than in tank 1201), and control valve 1207, such that gas within the tank 1205 is selectively released into the internal volume 604. It is further noted that use of metallic structures as sources, or tanks and control valves, is not mutually exclusive. Some example systems may have an impregnated wire as one gas source and a tank and valve structure as a second gas source.

The ionization region 606 in this example system comprises two ground electrodes 1204 and 1206. Ground electrode 1206 has an aperture 1208 therein through which ionized gases may be drawn into the acceleration region 608. The example ground electrodes 1204 and 1206 may be circularly shaped, and each may define a plane, where the planes are parallel to each other, and perpendicular to a central axis 1210 of the housing 602. The ionization region 606 further comprises electrode 1212 which, in one example system, comprises a metallic material in the form of hollow cylinder disposed coaxially with the central axis 1210 of the housing 602. A shown, the metallic electrode 1212 may be disposed between the ground electrodes 1204 and 1206. The ionization region 606 further comprises magnetic material 1214 arranged such that a magnetic field resides within the volume defined loosely by the electrodes 1204 and 1208, and the electrode 1212. In some cases the magnetic material 1214 resides outside the housing 602. Both permanent magnets and electromagnets may be used as the magnetic material 1214.

Ionized gas is created in the ionization region 606 by applying a high voltage (Vsource) on the electrode 1212 in relation to the ground electrodes 1204 and 1206. The voltage applied creates high electric field within the ionization region, directly or indirectly giving sufficient energy to outer-band electrons of the source gas to drive the electrons away from their respective atoms, thus creating ionized gas (in this case negatively charged). Depending on the size of the neutron tube, and other factors, the Vsource may be on the order of about 100,000 Volts. Other systems and structures for creating the ionized gas may be used, such as systems which apply radio-frequency electromagnetic fields to create gas plasma.

The acceleration region 608 comprises a metallic acceleration electrode 1216. In some cases, the acceleration electrode 1216 may be circularly shaped and comprise an aperture 1218 therein to enable the accelerated ionized gas to pass to the target region 610. Acceleration may be achieved by applying a positive voltage Vaccel to the acceleration electrode 1216. The electric field created between the acceleration electrode 1216 and a grounded electrode (in the example system, the ground electrode 1206 of the ionization region) accelerates the ionized gases toward the acceleration electrode 1216 and in many cases through the aperture 1218.

The acceleration region 608 further comprises a magnetic material 1220 in operational relationship to the area defined between the grounded electrode (as illustrated, electrode 1206) and the acceleration electrode 1216. In the view of FIG. 12, the magnetic field lines are parallel to the plane of the page. While in some example systems (e.g., to implement the system of FIG. 7 or FIG. 11), the magnetic material may be a permanent magnet. In other cases the magnetic material 1220 is an electromagnet defined by windings 1222 wound around a magnetic core material 1224. Thus, to apply a magnetic field to the acceleration region in an "on-off" sense, electrical current is applied (in an "on-off" sense) to the windings, such as by leads 1226. To change the polarity of the magnetic field in the acceleration region 608, the direction of current flow through the windings 1222 is changed. To change the magnetic field strength the magnitude of the electrical current flow through the windings 1222 is changed.

Finally, the target region 610 comprises one or more target (not shown) materials along linear or deflected paths in relation to the acceleration region 608. In the view of FIG. 12 with the magnetic field residing in the plane of the page, deflection of the ionized gases is either toward the viewer or away from the viewer. Stated otherwise, in the view of FIG. 12 with the magnetic field residing in the plane of the page deflection of the ionized gases is within a plane perpendicular to the plane of the page. Thus, additional target materials are not visible in the view of FIG. 12.

Figure 13:
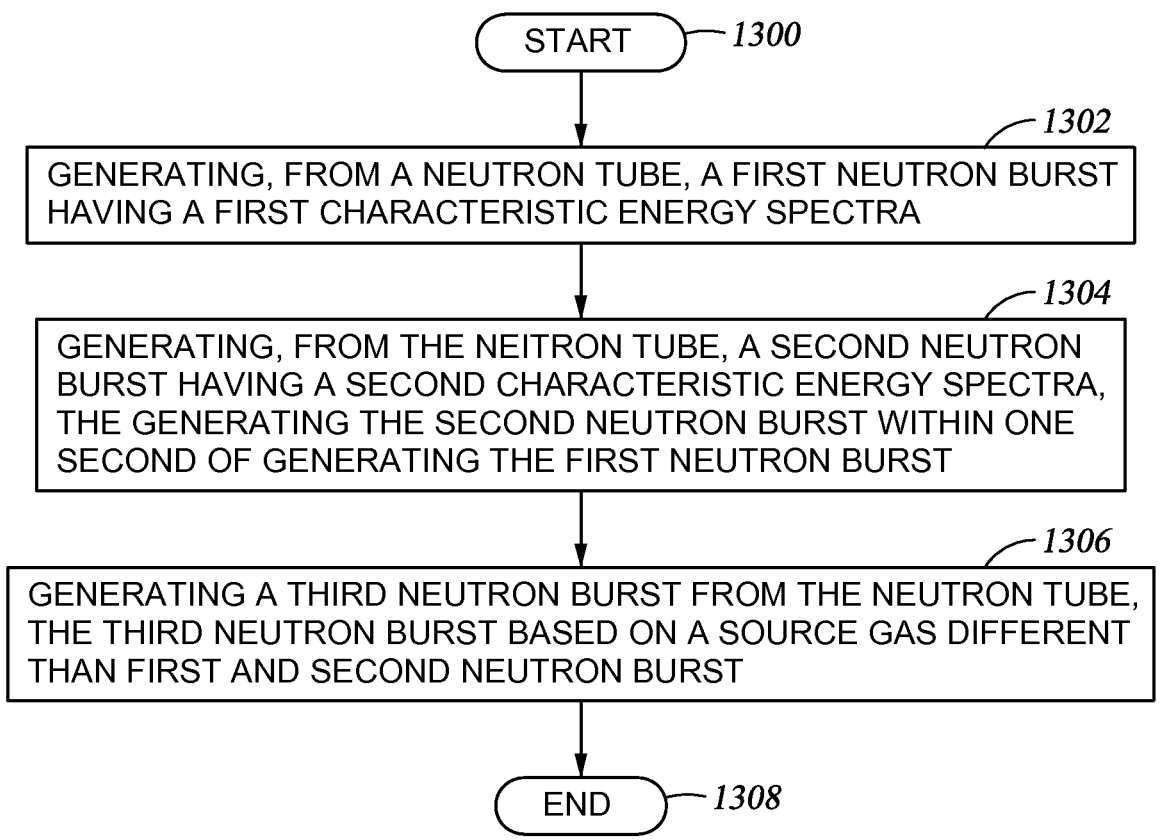
FIG. 13 shows a method in accordance with at least some embodiments.

FIG. 13 shows a method in accordance with at least some embodiments. In particular, the method starts (block 1300) and proceeds to generating, from a neutron tube, a first neutron burst having a first characteristic energy spectra (block 1302). The method then comprises generating, from the neutron tube, a second neutron burst having a second characteristic energy spectra, the generating the second neutron burst within one second of generating the first neutron burst (block 1304). Generating the second neutron burst may involve changing target material for collisions reactions, such as adjusting the presence, polarity, and/or magnitude of a magnetic field applied to an acceleration region of the neutron tube. The method may further comprise generating a third neutron burst from the neutron tube, the third neutron burst based on a source gas different than the first and second neutron bursts (block 1306), and thereafter the method ends (block 1308).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

We claim:
1. A method comprising:
releasing a first gas into a housing of a neutron tube;
ionizing at least a portion of the first gas in an ionization region within the housing, the ionizing creating a first ionized gas;
maintaining a first field strength and a first polarity of a magnetic field overlapping an acceleration region of an internal volume of the housing to accelerate the first ionized gas along a path in a first direction through the acceleration region to impinge on a first target material from a plurality of target materials disposed within the internal volume and generate a first neutron burst having a first characteristic energy spectrum; and
switching and maintaining the magnetic field to a second field strength and second polarity to change and maintain the path of the first ionized gas to impinge on a second target material of the plurality of target materials in the same direction of and spaced from the first target material in the internal volume to generate a second neutron burst within one second of the first neutron burst, the second neutron burst having a second characteristic energy spectrum different from the first characteristic energy spectrum.

2. The method of claim 1, further comprising wherein the internal volume is at a pressure less than atmospheric.

3. The method of claim 1, wherein:
the first target material further comprises is a deuterated target; and
selecting the second target material further comprises selecting the second target material being a tritiated target.

4. The method of claim 3, wherein:
releasing the gas into the housing further comprises releasing deuterium; and
accelerating the first ionized gas to generate the first neutron burst further comprises creating the first neutron burst by way of at least one collision scenario selected from the group consisting of: deuterium-deuterium reactions; and deuterium-tritium reactions.

5. The method of claim 3, wherein:
releasing the first gas into the housing further comprises releasing tritium; and
accelerating the first ionized gas to generate the first neutron burst further comprises creating the first neutron burst by way of at least one collision scenario selected from the group consisting of tritium-deuterium reactions and tritium-tritium reactions.

6. The method of claim 2 further comprising:
generating a third neutron burst by:
releasing a second gas into the housing of the neutron tube, the second gas different from the first gas;
ionizing at least a portion of the second gas in the ionization region within the housing, the ionizing creates a second ionized gas;

selecting the first target material; and
creating the third neutron burst by accelerating the second ionized gas to impinge on the first target material; and
generating a fourth neutron burst by:
selecting the second target material from the plurality of target materials disposed within the housing; and
creating the fourth neutron burst by accelerating the second ionized gas to impinge on the second target material.

7. The method of claim 1 wherein the neutron tube is locatable in a logging tool.

8. A system comprising:
a housing comprising an internal volume at a pressure less than atmospheric;
a first source of gas consisting of one particle type disposed within the internal volume;
an ionization structure disposed within the internal volume, wherein the ionization structure creates ionized gas within the internal volume;
a first target material disposed within the internal volume;
a second target material disposed within the internal volume;
an acceleration structure within the internal volume, wherein the acceleration structure comprises an acceleration region configured to accelerate ionized gas toward the first target or the second target; and
an electromagnet in operational relationship with the acceleration region, wherein the electromagnet is configured to control the field strength and polarity of a magnetic field transverse to a direction of travel of ionized gas within the acceleration region;
wherein the ionized gas is impingable on the first target material in a first direction from the ionization structure to generate a first neutron burst comprising a first characteristic energy spectrum when the magnetic field is maintained with a first field strength and a first polarity; and
wherein the ionized gas is impingable upon the second target material in the first direction from the ionization structure to generate a second neutron burst comprising a second characteristic energy spectrum different from the first characteristic energy spectrum when the electromagnet has been controlled to switch and maintain the magnetic field to a second field strength and polarity different from the first field strength and first polarity.

9. The system of claim 8 further comprising:
wherein the first source of gas further comprises a source of deuterium gas;
wherein the first target material is deuterated target;
wherein the second target material is a tritiated target; and
wherein by selective operation of the electromagnet the system generates neutrons by way of at least one collision scenario selected from the group consisting of deuterium-deuterium reactions and deuterium-tritium reactions.

10. The system of claim 8 further comprising:
wherein the first source of gas further comprises a source of tritium gas;
wherein the first target material is deuterated target;
wherein the second target material is a tritiated target; and
wherein by selective operation of the electromagnet the system generates neutrons by way of at least one collision scenario selected from the group consisting of tritium-deuterium reactions and tritium-tritium reactions.

11. The system of claim 8 further comprising:
a second source of gas comprising a source of tritium gas;
wherein the first source of gas further comprises a source of deuterium gas;
wherein the first target material is deuterated target;
wherein the second target material is a tritiated target; and
wherein by selective operation of the electromagnet, and by selective activation of the sources of gas, the system generates neutrons by way of at least one collision scenario selected from the group consisting of deuterium-deuterium reactions, deuterium-tritium reactions, tritium-deuterium reactions, and tritium-tritium reactions.

12. The system of claim 8:
the first target material disposed along a linear path in relation to the acceleration region; and
the second target material is disposed along a deflected path in relation to the acceleration region;
wherein the ionized gas impinges on the first target material when no electrical current is applied to the electromagnet; and
wherein ionized gas impinges upon the second target material when electrical current is applied to the electromagnet.

13. The system of claim 8, wherein:
the first target material is disposed along a first deflected path in relation to the acceleration region;
the second target material is disposed along a second deflected path in relation to the acceleration region, and the second deflected path is different from the first deflected path;
the ionized gas travels along the first deflected path and impinges on the first target when the magnetic field has the first polarity; and
the ionized gas travels along the second deflected path and impinges on the second target when the magnetic field has the second polarity opposite the first polarity.

14. The system of claim 8, further comprising:
a third target material disposed within the internal volume along a linear path in relation to the acceleration region;
wherein the first target material is disposed along a first deflected path in relation to the acceleration region;
wherein the second target material is disposed along a second deflected path in relation to the acceleration region, and the second deflected path is different than the first deflected path;
wherein the ionized gas travels along the first deflected path and impinges on the first target material when the magnetic field has the first polarity;
wherein the ionized gas travels along the second deflected path and impinges on the second target material when the magnetic field has the second polarity opposite the first polarity; and
wherein the ionized gas impinges on the third target material when no electrical current is applied to the electromagnet.

15. The system of claim 8 wherein the first source of gas of tritium further comprises a zirconium element embedded with tritium that releases tritium when heated.

16. The system of claim 8 wherein the source of deuterium further comprises a titanium element embedded with deuterium that releases deuterium when heated.

17. The system of claim 8 further comprising:
the first source of gas further comprises a source of deuterium gas; and a second source of gas disposed within the internal volume, the second source of gas comprising a source of deuterium gas.

18. The system of claim 8 wherein the housing is disposed within a formation evaluation tool.

* * * * *